US012183361B2

(12) United States Patent
Abesser

(10) Patent No.: US 12,183,361 B2
(45) Date of Patent: Dec. 31, 2024

(54) METHOD AND APPARATUS FOR RECOGNIZING ACOUSTIC ANOMALIES

(71) Applicant: Fraunhofer-Gesellschaft zur Foerderung der angewandten Forschung e.V., Munich (DE)

(72) Inventor: Jakob Abesser, Erfurt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 112 days.

(21) Appl. No.: 17/874,072

(22) Filed: Jul. 26, 2022

(65) Prior Publication Data

US 2022/0358952 A1 Nov. 10, 2022

Related U.S. Application Data

(63) Continuation of application No. PCT/EP2021/051804, filed on Jan. 27, 2021.

(30) Foreign Application Priority Data

Jan. 27, 2020 (DE) ..................... 10 2020 200 946.5

(51) Int. Cl.
*G10L 25/51* (2013.01)

(52) U.S. Cl.
CPC .................................... *G10L 25/51* (2013.01)

(58) Field of Classification Search
CPC .................................................. G08B 21/0469
See application file for complete search history.

(56) References Cited

U.S. PATENT DOCUMENTS

| | | | |
|---|---|---|---|
| 4,429,578 A | 2/1984 | Darrel et al. |
| 2002/0005782 A1 | 1/2002 | Sakai et al. |

(Continued)

FOREIGN PATENT DOCUMENTS

| | | |
|---|---|---|
| DE | 60113198 T2 | 10/2005 |
| DE | 102008035005 A1 | 1/2010 |

(Continued)

OTHER PUBLICATIONS

Borges, Nash, et al., "[Uploaded in 2 parts] Trimmed KL Divergence between Gaussian Mixtures forRobust Unsupervised Acoustic Anomaly Detection", Interspeech, 2009, pp. 2555-2558, pp. 2555-2556.

(Continued)

*Primary Examiner* — James K Mooney
(74) *Attorney, Agent, or Firm* — Perkins Cole LLP; Michael A. Glenn

(57) ABSTRACT

A method for detecting anomalies has the following steps: Obtaining a long-term recording having a plurality of first audio segments associated to respective first time windows; analyzing the plurality of the first audio segments to obtain, for each of the plurality of the first audio segments, a first characteristic vector describing the respective first audio segment; obtaining a further recording having one or more second audio segments associated to respective second time windows; analyzing the one or more second audio segments to obtain one or more characteristic vectors describing the one or more second audio segments ABCD; matching the one (Continued)

100 or more second characteristic vectors with the plurality of the first characteristic vectors to recognize at least one anomaly, like a temporal, sound or spatial anomaly.

17 Claims, 3 Drawing Sheets

(56) References Cited

U.S. PATENT DOCUMENTS

| | | | | |
|---|---|---|---|---|
| 2012/0185418 | A1* | 7/2012 | Capman .................. | G06F 3/165 706/12 |
| 2014/0046878 | A1* | 2/2014 | Lecomte ........... | G06F 18/23213 706/12 |
| 2015/0177363 | A1 | 6/2015 | Hermann et al. | |
| 2017/0154638 | A1* | 6/2017 | Hwang ................... | G01S 3/808 |
| 2019/0257794 | A1 | 8/2019 | Mcgovern et al. | |

FOREIGN PATENT DOCUMENTS

| | | | |
|---|---|---|---|
| DE | 102012211154 | A1 | 1/2014 |
| DE | 102014118084 | A1 | 6/2015 |
| DE | 102017010402 | A1 | 5/2019 |
| DE | 102017012007 | A1 | 6/2019 |
| EP | 2988105 | A2 | 2/2016 |
| JP | H07182035 | A | 7/1995 |
| WO | 2010009797 | A1 | 1/2010 |
| WO | 2010039130 | A1 | 4/2010 |
| WO | 2019159103 | A1 | 8/2019 |
| WO | 2019215166 | A1 | 11/2019 |

OTHER PUBLICATIONS

Borges, Nash, et al., "Unsupervised Distributional Anomaly Detection for a Self-Diagnostic Speech Activity Detector", CISS, 2008, pp. 950-955, pp. 950-955.

Das, A., et al., "Unsupervised anomaly detection in underwater acoustic sensor networks", In: Journal of Intelligent & Fuzzy Systems 36 (2019) 2367-2372. DOI:10.3233/JIFS-169947, pp. 2367-2372.

Komatsu, Tatsuya, et al., "Detection of Anomaly Acoustic Scenes based on a Temporal Dissimilarity Model", ICASSP 2017, pp. 376-380, pp. 376-380.

Marchi, Erik, et al., "A Novel Approach for Automatie Acoustic Novelty Detection using a Denoising Autoencoder withBidirectional LSTM Neural Networks", ICASSP 2015, pp. 1996-2000, pp. 1996-2000.

Ntalampiras, Stavros, et al., "On Acoustic Surveillance of Hazardous-Situations", ICASSP, 2009, pp. 165-168, pp. 165-168.

Tuor, Aaron, et al., "Deep Learning for Unsupervised Insider Threat Detection in Structured Cybersecurity Data Streams", AAAI 2017, pp. 224-231, pp. 224-231.

Valenzise, G., et al., "[Uploaded in 2 parts] Scream and Gunshot Detection and Localization for Audio-Surveillance Systems", IEEE ICAVSBS, 2017, pp. 21-26, pp. 21-23.

Xia, X, et al., "A Survey: Neutral Network-Based Deep Learning for Acoustic Event Detection", In: Circuits, Systems and Signal Processing 38 (2019) 3433-3453, pp. 3433-3453.

* cited by examiner

METHOD AND APPARATUS FOR RECOGNIZING ACOUSTIC ANOMALIES

CROSS-REFERENCE TO RELATED APPLICATIONS

This application is a continuation of copending International Application No. PCT/EP2021/051804, filed Jan. 27, 2021, which is incorporated herein by reference in its entirety, and additionally claims priority from German Application No. 10 2020 200 946.5, filed Jan. 27, 2020, which is also incorporated herein by reference in its entirety.

TECHNICAL FIELD

Embodiments of the present invention relate to a method, an apparatus for recognizing acoustic anomalies. Further embodiments relate to a corresponding computer program. In accordance with embodiments, recognizing a normal situation takes place, as well as recognizing anomalies when compared to this normal situation.

BACKGROUND OF THE INVENTION

In real acoustic scenes, there is usually complex superpositioning of several sound sources. These may be spatially positioned in the foreground and background as desired. Additionally, a plurality of potential sounds is conceivable, which may reach from very short transient signals (like applause, gunshot) to longer, stationary sounds (alarm sirens, passing train). Recording usually includes a certain period of time which, when looked at subsequently, is subdivided into one or several time windows. Starting from this subdivision and depending on the length of noises (for example transient or longer, stationary sounds), noise may extend across one or more audio segments/time windows.

In many application scenarios, an anomaly, i.e. a sound deviation from the "acoustic normal state", i.e. the amount of noises considered to be "normal", is to be recognized. Examples of such anomalies are glass breaking (burglar detection), gunshots (supervising public events) or a chainsaw (supervising natural reserves).

It is problematic that the sound of the anomaly (not-okay class) frequently is unknown or cannot be defined or described precisely (for example, what is the sound of a broken machine?).

The second problem is that new algorithms for sound classification by means of deep neural networks are very sensitive to changed (and frequently unknown) acoustic conditions in the application scenario. Classification models which are trained using audio data which were recorded using a high-quality microphone, for example, achieve only poor recognition rates when classifying audio data recorded by means of a poorer microphone. Potential solution approaches are in the field of "domain adaptation", i.e. adapting the models or the audio data to be classified in order to achieve higher robustness for recognition. However, in practice, it is frequently logistically difficult and too expensive to record representative audio recordings at the future place of application of an audio analysis system and subsequently annotate the same relative to sound events contained therein.

The third problem of audio analysis of environmental noises is data-protection concerns since classification methods may theoretically also be used for recognizing and transcripting voice signals (for example when recording a conversation close to the audio sensor).

The classification models of existing prior-art solutions are as follows:

When the sound anomaly to be detected can be specified precisely, a classification model can be trained based on machine learning algorithms by means of supervised learning for recognizing certain noise classes. Current studies have shown that neural networks in particular are very sensitive to changed acoustic conditions and that an additional adaptation of classification models to the respective acoustic situation of the application has to be performed.

When starting from the disadvantages as described before, there is demand for an improved approach. It is the object of the present invention to provide a concept for detecting anomalies which is optimized with regard to the learning behavior and allows reliably and precisely recognizing anomalies.

SUMMARY

According to an embodiment, a method for recognizing acoustic anomalies may have the steps of: obtaining a long-term recording having a plurality of first audio segments associated to respective first time windows; analyzing the plurality of the first audio segments to obtain, for each of the plurality of the first audio segments, a first characteristic vector describing the respective first audio segment; obtaining a further recording having one or more second audio segments associated to respective second time windows; analyzing the one or more second audio segments to obtain one or more characteristic vectors describing the one or more second audio segments ABCD; matching the one or more second characteristic vectors with the plurality of the first characteristic vectors to recognize at least one anomaly when compared to an acoustic normal situation for this environment.

Another embodiment may have a non-transitory digital storage medium having stored thereon a computer program for performing a method for recognizing acoustic anomalies, having the steps of: obtaining a long-term recording having a plurality of first audio segments associated to respective first time windows; analyzing the plurality of the first audio segments to obtain, for each of the plurality of the first audio segments, a first characteristic vector describing the respective first audio segment; obtaining a further recording having one or more second audio segments associated to respective second time windows; analyzing the one or more second audio segments to obtain one or more characteristic vectors describing the one or more second audio segments ABCD; matching the one or more second characteristic vectors with the plurality of the first characteristic vectors to recognize at least one anomaly when compared to an acoustic normal situation for this environment, when said computer program is run by a computer.

According to another embodiment, an apparatus for recognizing acoustic anomalies may have: an interface for obtaining a long-term recording having a plurality of first audio segments associated to respective first time windows, and for obtaining a further recording having one or more second audio segments associated to respective second time windows; and a processor configured for analyzing the plurality of the first audio segments to obtain, for each of the plurality of the first audio segments, a first characteristic vector describing the respective first audio segment, and configured for analyzing the one or more second audio segments to obtain one or more characteristic vectors describing the one or more second audio segments, and configured for matching the one or more second characteristic vectors with the plurality of the first characteristic vectors to recognize at least one anomaly when compared to an acoustic normal situation for this environment.

Embodiments of the present invention provide a method for recognizing acoustic anomalies. The method comprises the steps of obtaining a long-term recording having a plurality of first audio segments associated to respective first time windows, and analyzing the plurality of first audio segments to obtain, for each of the plurality of the first audio segments, a first characteristic vector describing the respective first audio segment, like a spectrum for the audio segment (time-frequency spectrum) or an audio fingerprint having certain characteristics for the audio segment, for example. The result of the analysis of a long-term recording subdivided into a plurality of time windows, for example, is a plurality of first (one-dimensional or multi-dimensional) characteristic vectors for the plurality of the first audio segments (associated to the corresponding points in time/time windows of the long-term recording) representing the "normal state". The method comprises further steps of obtaining another recording having one or more second audio segments associated to respective second audio windows, and analyzing the one or more second audio segments to obtain one or more characteristic vectors describing the one or more second audio segments. This means that the result of the second part of the method exemplarily is a plurality of second characteristic vectors (for example, with corresponding points in time of the further recording). In a subsequent step, matching one or more second characteristic vectors with the plurality of the first characteristic vectors takes place (for example by comparing the identities or similarities or by recognizing an order) to recognize at least one anomaly. In accordance with embodiments, recognizing different forms of anomalies would be conceivable, i.e. a sound anomaly (i.e. recognizing a so far unheard sound for the first time), a temporal anomaly (for example changed repetition pattern of a sound heard already) or a spatial anomaly (a sound heard already occurs at a so far unknown spatial position).

Embodiments of the present invention are based on the finding that an "acoustic normal state" and "normal noises" can be learned independently by a long-term sound analysis (phase 1 of the method including the steps of obtaining a long-term recording and analyzing the same) alone. This means that this long-term analysis allows independently or autonomously adapting an analysis system to a certain acoustic scene. Annotated training data (recording+semantic class annotation) are not required, which allows large savings in time, complexity and costs. When this acoustic "normal state" or the "normal" noises have been detected, the current noise environment can take place in a subsequent analysis phase (phase 2 including the steps of obtaining a further recording and analyzing the same). The current audio segment/current noise scenario here is matched with the "normal" noises recognized or learned before/in phase 1. Generally, this means that phase 1 allows learning a model using the normal noise setting based on a statistic method or machine learning, wherein this model subsequently (in phase 2) allows matching currently recorded noise settings as to their degree of novelty (probability of anomaly).

Another advantage of this approach is that the privacy of persons potentially located in the direct surroundings of the acoustic sensors is protected. This is referred to as privacy-by-design. Due to the system involved, voice recognition is not possible since the interface is defined clearly (audio in, anomaly probability function out). This means that potential data protection concerns when using acoustic sensors can be dispelled.

Since the long-term recording represents the acoustic normal situation, the plurality of first audio segments themselves and/or in their order describe this normal situation. This means that the plurality of first audio segments themselves and/or when combined represent a kind of reference. The target of this method is recognizing anomalies when compared to this normal situation. This means that, in accordance with embodiments, the result of the clustering described above is a description of the reference using first audio segments. The step in which the anomaly is determined includes comparing the second audio segments themselves or their combination (i.e. order) to the reference in order to represent the anomaly. The anomaly is a deviation of the current acoustic situation described by the second characteristic vectors from the reference described by the first characteristic vectors. In other words, this means that, in accordance with embodiments, the first characteristic vectors themselves or in combination represent a reference representation of the normal state, whereas the second characteristics vectors themselves or in combination describe the current acoustic situation so that, in step 126, the anomaly in the form of a deviation of the description of the current acoustic situation (cf. second characteristic vectors) from the reference (cf. first characteristic vectors) can be recognized. This means that the anomaly is defined by the fact that at least one of the second acoustic characteristic vectors deviates from the series of the first acoustic characteristic vectors. Potential deviations may be: sound anomalies, temporal anomalies and spatial anomalies.

In accordance with an embodiment, phase 1 means detecting a plurality of first audio segments, which are subsequently also referred to as "normal" noises/audio segments or those considered to be "normal". In accordance with embodiments, knowing these "normal" audio segments allows recognizing a so-called sound anomaly. This entails performing the sub-step of identifying a second characteristic vector which differs from the analyzed first characteristic vector.

In accordance with further embodiments, when analyzing, the method comprises the sub-step of identifying a repetition pattern in the plurality of the first time windows. Repeating audio segments are identified here, and the resulting pattern is determined from it. In accordance with embodiments, identifying takes place using repeating, identical or similar first characteristic vectors belonging to different first audio segments. In accordance with embodiments, when identifying, grouping identical and similar first characteristic vectors or first audio segments to form one or more groups may take place.

In accordance with embodiments, the method comprises recognizing an order of first characteristic vectors belonging to the first audio segments, or recognizing an order of groups of identical or similar first characteristic vectors or first audio segments. The basic steps advantageously allow recognizing normal noises, or recognizing normal audio objects. The combination of these normal audio objects with regard to time to a certain order or a certain repetition pattern represents an acoustic normal state.

In accordance with further embodiments, it would also be conceivable for a repetition pattern in the one or more second time windows and/or an order of second characteristic vectors belonging to different second audio objects or groups of identical or similar second characteristic vectors to be recognized. In accordance with further embodiments, this method allows, when matching, the sub-step of matching the repetition pattern of the first audio segment and/or order in the first audio segments with the repetition pattern of the second audio segments and/or the order in the second audio segments. This matching allows recognizing a temporal anomaly.

In accordance with another embodiment, the method may comprise the step of determining a respective position for the respective first audio segments. In accordance with an embodiment, determining the respective position for the respective second audio segments can be performed. In accordance with an embodiment, this allows recognizing a spatial anomaly by the sub-step of matching the position associated to the respective first audio segments with the position associated to the respective second audio segment.

It is to be pointed out here that at least two microphones, for example, are used for spatial localization, whereas one microphone is sufficient for the other two types of anomalies.

As indicated before, each characteristic vector (first and second characteristic vector) for the different audio segments may comprise one dimension or several dimensions. A potential realization of a characteristic vector would, for example, be a time-frequency spectrum. In accordance with an embodiment, the dimension space may also be reduced. This means that, in accordance with embodiments, the method comprises the step of reducing the dimensions of the characteristic vector.

In accordance with another embodiment, the method may comprise the step of determining a probability of occurrence of the respective first audio segment and outputting the probability of occurrence together with the respective first characteristic vector. Alternatively, the method may comprise the step of determining a probability of occurrence of the respective first audio segment and outputting the probability of occurrence including the respective first characteristic vector and a respective first time window. This means that the probability of occurrence for the respective audio segment or a closer probability of the occurrence of the audio segment at this point in time is output. Outputting is done using the corresponding data set or characteristic vector.

In accordance with an embodiment, the method may also be computer-implemented. This means that the method comprises a computer program having program code for performing the method.

Further embodiments relate to an apparatus having an interface and a processor. The interface serves for obtaining a long-term recording having a plurality of first audio segments associated to respective first time windows and for obtaining another recording having one or more second audio segments associated to respective second time windows. The processor is configured to analyze the plurality of first audio segments to obtain, for each of the plurality of first audio segments, a first characteristic vector describing the respective first audio segment. Additionally, the processor is configured to analyze the one or more second audio segments to obtain one or more characteristic vectors describing the one or more second audio segments. Additionally, the processor is configured to match the one or more second characteristic vectors with the plurality of the first characteristic vectors to recognize at least one anomaly.

In accordance with embodiments, the apparatus comprises a recording unit connected to the interface, like a microphone or microphone array, for example. The microphone array advantageously allows determining the position as discussed before. In accordance with further embodiments, the apparatus comprises an output interface for outputting the probability of occurrence discussed before.

BRIEF DESCRIPTION OF THE DRAWINGS

Embodiments of the present invention will be discussed below referring to the appended drawings, in which.

DETAILED DESCRIPTION OF THE INVENTION

Before discussing the following embodiments of the present invention making reference to the appended drawings, it is pointed out that elements and structures of equal effect are provided with equal reference numbers so that the description thereof is mutually applicable or interchangeable.

Figure 1:
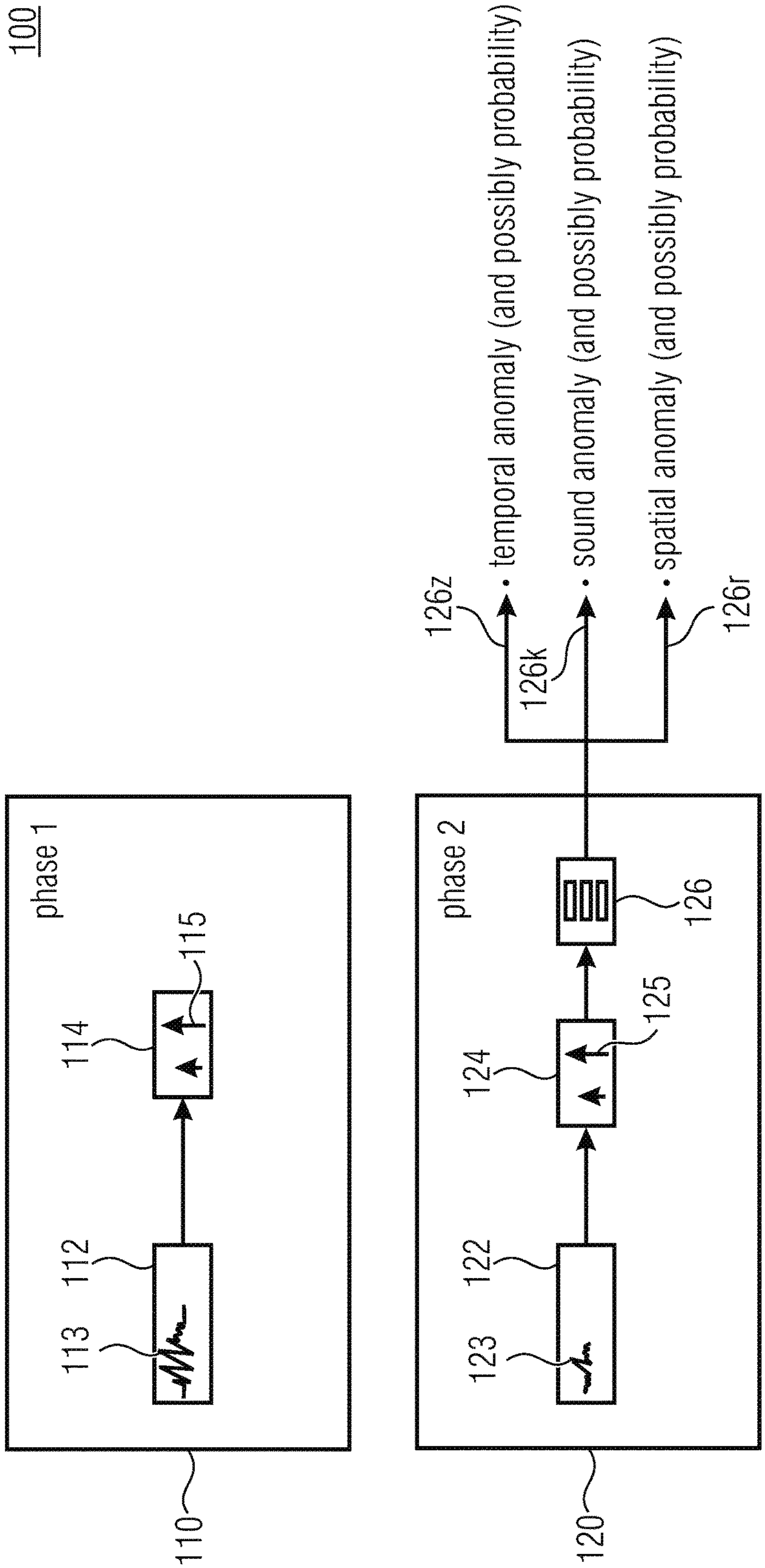
FIG. 1 is a schematic flow chart for illustrating the method in accordance with a basic embodiment.

FIG. 1 shows a method 100 subdivided into two phases 110 and 120.

In the first phase 110, which is referred to as adjusting phase, there are two basic steps. This is indicated by the reference numerals 112 and 114. Step 112 comprises a long-term recording of the acoustic normal state in the application scenario. The analysis apparatus 10 (cf. FIG. 3) is exemplarily set up in the target environment so that a long-term recording 113 of the normal state is detected. This long-term recording may exemplarily have a duration of 10 minutes, 1 hour, or 1 day (generally greater than 1 minute, greater than 30 minutes, greater than 5 hours or greater than 24 hours and/or up to 10 hours, up to 1 day, up to 3 days or up to 10 days (including the time windows defined by the upper and lower).

This long-term recording 113 is then subdivided, for example. The subdivision may be performed to form time regions of equal duration, like 1 second or 0.1 second, for example, or dynamic time regions. Everytime region comprises an audio segment. In step 114, which is generally referred to as analyzing, this audio segment is examined separately or in combination. When analyzing, a so-called characteristic vector 115 (first characteristic vectors) is determined for each audio segment. Expressed generally, this means that a conversion from a digital recording 113 to one or more characteristic vectors 115—for example by means of deep neural networks—takes place, wherein each characteristic vector 115 "encodes" the sound at a certain point in time. Characteristic vectors 115 can, for example, be determined by an energy spectrum for a certain frequency range or, generally, a time-frequency spectrum.

It is to be pointed out here that, optionally, it is possible to reduce the dimensionality of the characteristic space of the characteristic vectors 115 by means of statistical methods (like main-component analysis). In step 114, optionally, typical or dominant noises can be identified by means of unmonitored learning methods (like clustering). Here, time sections or audio segments comprising similar characteristic vectors 115 and correspondingly comprising a similar sound are grouped together. No semantic classification of a noise (like "car" or "airplane") is necessary here. This means that a so-called unmonitored learning using frequencies of repeating or similar audio segments takes place. In accordance with another embodiment, it would also be conceivable for unmonitored learning of the temporal order and/or typical repetition patterns of certain noises to take place in step 114.

The result of clustering is a composition of audio segments or noises, which are normal or typical of this region. Exemplarily, a probability of occurrence may be associated to each audio segment. Additionally, a repetition pattern or order, i.e. a combination of several audio segments, for which the current environment tis typical or normal can be identified. A probability can be associated here to each grouping, each repetition pattern or each series of different audio segments.

At the end of the adjusting phase, audio segments or grouped audio segments are known and described as characteristic vectors 115 typical of this environment. In a next step or next phase 120, this learned knowledge is applied correspondingly. Phase 120 comprises three basic steps 122, 124, and 126.

In step 122, an audio recording 123 is recorded. When compared to the audio recording 113, it is typically much shorter. This audio recording is, for example, shorter when compared to the audio recording 113. However, it may also be a continuous audio recording. This audio recording 123 is then analyzed in a downstream step 124. This step is comparable as regards contents to step 114. Again, the digital audio recording 123 is converted to characteristic vectors. When these two characteristic vectors 125 are finally present, they can be compared to the characteristic vectors 115.

The comparison of step 126 is performed with the goal of determining anomalies. Very similar characteristic vectors and very similar orders of characteristic vectors hint at the fact that there is no anomaly. Deviations from patterns determined before (repetition patterns, typical orders etc.) or deviations from the audio segments determined before characterized by other/new characteristic vectors hint at an anomaly. These are recognized in step 126.

In step 126, different types of anomalies can be recognized. Examples of these are:

- Sound anomaly (new sound unheard so far),
- Temporal anomaly (sound already heard occurs at an "unsuitable" time, is repeated too fast or occurs in a wrong order with other sounds),
- Spatial anomaly (sound heard already occurs at "unfamiliar" spatial position, or the corresponding source follows an unfamiliar spatial motion pattern).

Figure 2:
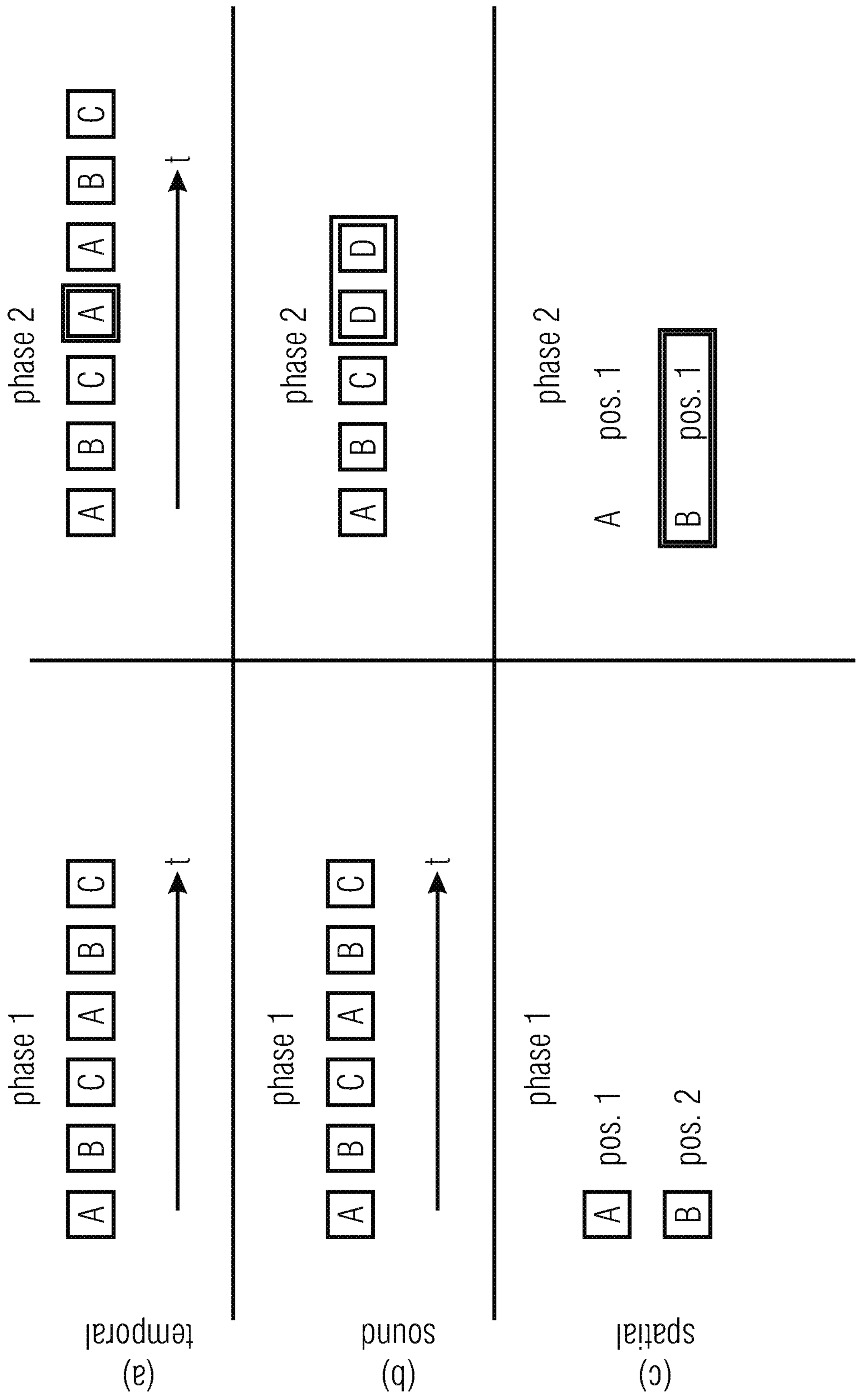
FIG. 2 shows a schematic table for illustrating different types of anomalies.

These anomalies will be discussed in detail referring to FIG. 2.

Optionally, a probability can be output for each of the three types of anomalies at a time x. This is illustrated by the arrows 126*z*, 126*k*, and 126*r* (one arrow per type of anomaly) in FIG. 3.

It is to be pointed out here that, when comparing the characteristic vectors, frequently there is not identity, but only similarity. This means that, in accordance with embodiments, threshold values can be defined of when characteristic vectors are similar or when groups of characteristic vectors are similar so that the result also presents a threshold value for an anomaly. This threshold value application can follow outputting the probability distribution or occur in combination, for example in order to allow more precise temporal recognition of anomalies.

In accordance with further embodiments, it is also possible to recognize spatial anomalies. Here, step 114, in the adjusting phase 110, may also comprise unmonitored learning of typical spatial positions and/or movements of certain noises. Typically, in such a case, instead of the microphone 18 illustrated in FIG. 3, there are two microphones or a microphone array having at least two microphones. In such a situation, in the second phase 120, spatial localization of the current dominant sound sources/audio segments is also possible using a multi-channel recording. The basic technology may be beam forming, for example.

Referring to FIGS. 2*a*-2*c*, three different anomalies will be discussed. FIG. 2*a* illustrates temporal anomaly. Respective audio segments ABC for both phase 1 and phase 2 are plotted along the time axis t. In phase 1, it was recognized that a normal situation or normal order is present such that the audio segments ABC occur in the order of ABC. For one of them, a repetition pattern was recognized so that, after the first group ABC, another group ABC may follow.

When precisely this pattern ABCABC is recognized in phase 2, it can be assumed that there is no anomaly, or at least no temporal anomaly. If, however, the pattern ABCAABC illustrated here is recognized, there is a temporal anomaly since a further radio segment A is arranged between the two groups ABC. This audio segment A or abnormal audio segment A is provided with a double frame.

A sound anomaly is illustrated in FIG. 2*b*. In phase 1, the audio segments ABCABC were again recorded along the time axis t (cf. FIG. 2*a*). The sound anomaly when recognizing shows in that another audio segment, in this case the audio segment D, occurs in phase 2. This audio segment D is of increased length, i.e. extends over two time regions and therefore is illustrated as DD. The sound anomaly is provided with a double frame in the order of types of the audio segments. This sound anomaly may, for example, by a sound never heard during the learning phase. Exemplarily, this may be a thunder sound, which differs from previous elements ABC as regards loudness/intensity and as regards length.

A spatial anomaly is illustrated in FIG. 2*c*. In the initial learning phase, two audio segments A and B were recognized at two different positions, position 1 and position 2. During phase 2, both elements A and B were recognized again, wherein localization determined that both the audio segment A and the audio segment B are located at position 1. This means that the presence of audio segment B at the position 1 is a spatial anomaly.

Figure 3:
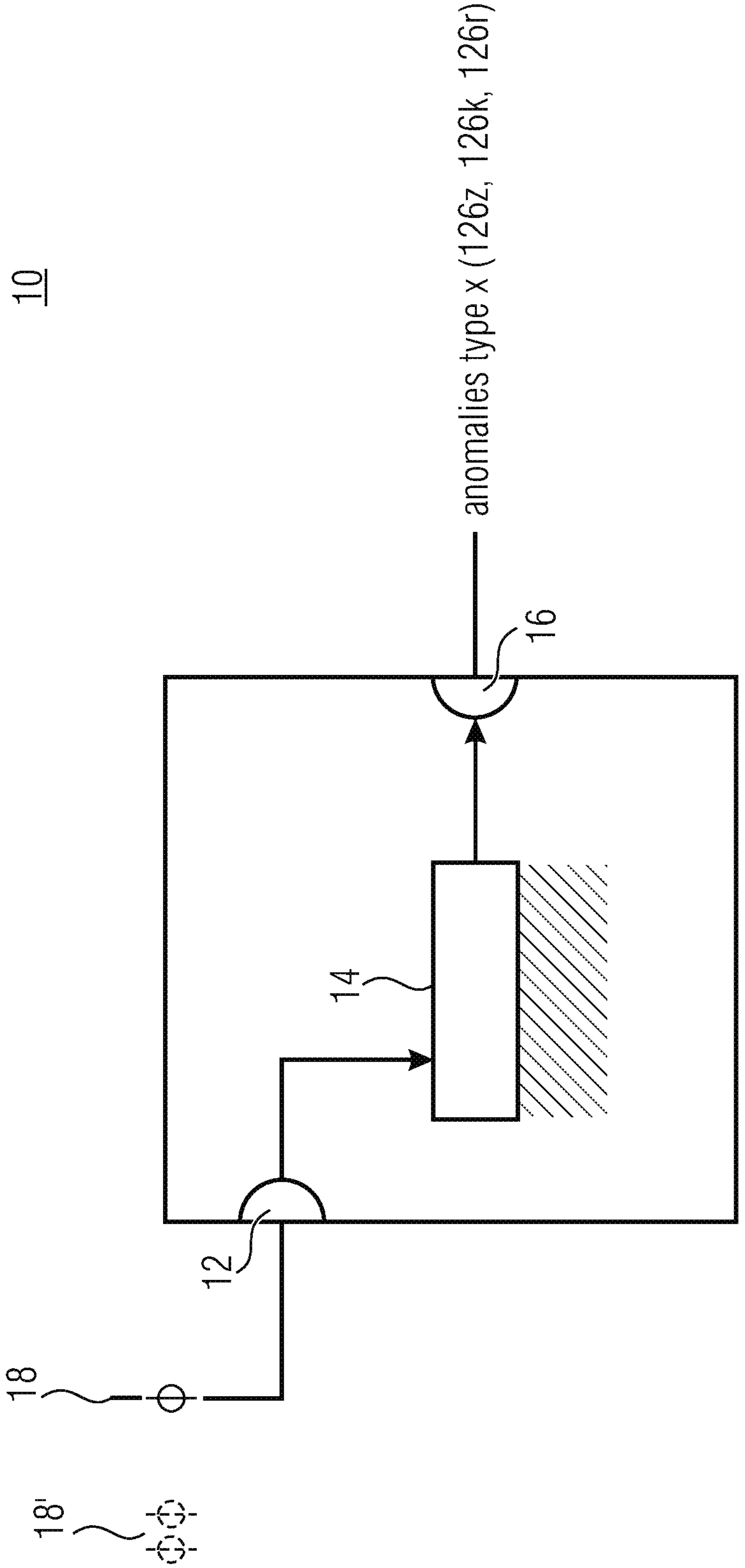
FIG. 3 is a schematic block circuit diagram for illustrating an apparatus in accordance with another embodiment.

Referring to FIG. 3, an apparatus 10 for sound analysis will be discussed. The apparatus 10 basically comprises the input interface 12, like a microphone interface, and a process 14. The processor 14 receives the one or more (present at the same time) audio signals from the microphone 18 or the microphone array 18' and analyzes the same. Here, it basically performs steps 114, 124, and 126 discussed in connection with FIG. 1. The result to be output (cf. output interface 16) for each phase is a set of characteristic vectors representing the normal state, or, in phase 2, an output of the recognized anomalies, for example associated to a certain type and/or associated to a certain point in time.

Additionally, at the interface 16, a probability of anomalies or probability of anomalies at certain points in time or, generally, a probability of characteristic vectors at certain points in time can be determined.

In accordance with embodiments, the apparatus 10 or the audio system is configured to recognize (simultaneously) different types of anomalies, like at least two anomalies, for example. The following fields of application are conceivable:

- Security monitoring of buildings and facilities
  - Detection of burglary (like glass breaking)/damage (vandalism)

Predictive Maintenance
- Recognizing the onset of abnormal machine behavior due to unfamiliar sounds Monitoring public spaces/events (sports events, music events, demonstrations, rallies, etc.)
- Recognizing danger noises (explosion, gunshot, cries for help)

Traffic monitoring
- Recognizing certain vehicle noises (like spinning wheels—speeders)

Logistics monitoring
- Monitoring construction sites—recognizing accidents (collapse, cries for help)

Health
- Acoustic monitoring of the normal everyday life of elderly/ill people
- Recognizing people falling/crying for help Although some aspects have been described in the context of an apparatus, it is clear that these aspects also represent a description of the corresponding method such that a block or device of an apparatus also corresponds to a respective method step or a feature of a method step. Analogously, aspects described in the context with or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention may be implemented in hardware or in software. The implementation can be performed using a digital storage medium, for example a floppy disk, a DVD, a Blu-Ray disc, a CD, ROM, PROM, EPROM, EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium or the computer-readable medium are typically tangible and/or non-transitory.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises an apparatus or a system configured to transfer a computer program for performing at least one of the methods described herein to a receiver. The transmission can, for example, be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be universally applicable hardware, such as a computer processor (CPU), or hardware specific for the method, such as ASIC.

The apparatus described herein may be implemented, for example, using a hardware apparatus, or using a computer, or using a combination of a hardware apparatus and a computer.

The apparatus described herein, or any component of the apparatus described herein may be implemented at least partly in hardware and/or software (computer program).

The methods described herein may be implemented, for example, using a hardware apparatus, or using a computer, or using a combination of a hardware apparatus and a computer.

The methods described herein, or any component of the methods described herein may be performed at least partly by hardware and/or software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

SCIENTIFIC LITERATURE

[Borges_2008] N. Borges, G. G. L. Meyer: Unsupervised Distributional Anomaly Detection for a Self-Diagnostic Speech Activity Detector, CISS, 2008, pp. 950-955.

[Ntalampiras_2009] S. Ntalampiras, I. Potamitis, N. Fakotakis: On Acoustic Surveillance of Hazardous Situations, ICASSP, 2009, pp. 165-168.

[Borges_2009] N. Borges, G. G. L. Meyer: Trimmed KL Divergence between Gaussian Mixtures for Robust Unsupervised Acoustic Anomaly Detection, INTERSPEECH, 2009.

[Marchi_2015] E. Marchi, F. Vesperini, F. Eyben, S. Squartini, B. Schuller: A Novel Approach for Automatic Acoustic Novelty Detection using a Denoising Autoencoder with Bidirectional LSTM Neural Networks, ICASSP 2015, pp. 1996-2000.

[Valenzise_2017] G. Valenzise, L. Gerosa, M. Tagliasacchi, F. Antopnacci, A. Sarti: Scream and Gunshot Detection and Localization for Audio-Surveillance Systems, IEEE ICAVSBS, 2017, pp. 21-26.

[Komatsu_2017] T. Komatsu, R. Kondo: Detection of Anomaly Acoustic Scenes based an a Temporal Dissimilarity Model, ICASSP 2017, pp. 376-380.

[Tuor_2017] A. Tuor, S. Kaplan, B. Hutchinson, N. Nichols, S. Robinson: Deep Learning for Unsupervised Insider Threat Detection in Structured Cybersecurity Data Streams, AAAI 2017, pp. 224231.

The invention claimed is:

1. A method for recognizing acoustic anomalies, comprising:

obtaining a long-term recording having a plurality of first audio segments associated to respective first time windows;

analyzing the plurality of the first audio segments to obtain, for each of the plurality of the first audio segments, a first characteristic vector describing the respective first audio segment; wherein the long-term recording comprises at least a duration of 1 minute or 10 minutes or at least 1 hour or at least 24 hours;

obtaining a further recording having one or more second audio segments associated to respective second time windows;

analyzing the one or more second audio segments to obtain one or more characteristic vectors describing the one or more second audio segments;

matching the one or more second characteristic vectors with the plurality of the first characteristic vectors to recognize at least one anomaly when compared to an acoustic normal situation for this environment; and the method:

when analyzing, comprising the sub-step of identifying a repetition pattern in the plurality of the first time windows; or comprising recognizing an order of first characteristic vectors belonging to different first audio segments or recognizing an order of groups of identical or similar first characteristic vectors.

2. The method in accordance with claim 1, wherein the anomaly comprises a sound, temporal and/or spatial anomaly; and/or wherein the anomaly comprises a sound anomaly in combination with a temporal anomaly or a sound anomaly in combination with a spatial anomaly or a temporal anomaly in combination with a spatial anomaly.

3. The method in accordance with claim 1, wherein identifying is performed using repeating, identical or similar first characteristic vectors belonging to different first audio segments.

4. The method in accordance with claim 1, wherein, when identifying, grouping of identical or similar first characteristic vectors to form one or more groups is performed.

5. The method in accordance with claim 1, the method comprising identifying a repetition pattern in the one or more second time windows; and/or the method comprising recognizing an order of second characteristic vectors belonging to different second audio segments or recognizing an order of groups of identical or similar second characteristic vectors.

6. The method in accordance with claim 1, the method comprising the sub-step of matching the repetition pattern of the first audio segments and/or order in the first audio segments with the repetition pattern of the second audio segments and/or order in the second audio segments in order to recognize a temporal anomaly.

7. The method in accordance with claim 1, wherein matching comprises the sub-step of identifying a second characteristic vector, which differs from the first characteristic vectors analyzed, in order to recognize a sound anomaly.

8. The method in accordance with claim 1, wherein the characteristic vector comprises one dimension, more dimensions or a reduced dimension space; and/or wherein the method comprises the step of reducing the dimensions of the characteristic vector.

9. The method in accordance with claim 1, the method comprising the step of determining a respective position for the respective first audio segments.

10. The method in accordance with claim 9, the method comprising the step of determining a respective position for the respective second audio segments, and the method comprising the sub-step of matching the position associated to the respective first audio segment with the position associated to the corresponding respective second audio segment in order to recognize a spatial anomaly.

11. The method in accordance with claim 1, the method comprising the step of determining a probability of occurrence of the respective first audio segment and outputting the probability of occurrence with the respective first characteristic vector, or the method comprising the step of determining a probability of occurrence of the respective first audio segment and outputting the probability of occurrence with the respective first characteristic vector and a first time window.

12. The method in accordance with claim 1, wherein the plurality of the first audio segments and/or the plurality of the first audio segments in their order describe an acoustic normal state in the application scenario and/or represent a reference; and/or wherein the one anomaly is recognized when one or more second characteristic vectors deviate from the plurality of the first characteristic vectors.

13. The method in accordance with claim 1, wherein the further recoding comprises a time window or, in particular, a time window of less than 5 minutes, less than 1 minute, or less than 10 seconds.

14. A non-transitory digital storage medium having stored thereon a computer program for performing a method for recognizing acoustic anomalies, comprising:

obtaining a long-term recording having a plurality of first audio segments associated to respective first time windows, wherein the long-term recording comprises at least a duration of 1 minute or 10 minutes or at least 1 hour or at least 24 hours;

analyzing the plurality of the first audio segments to obtain, for each of the plurality of the first audio segments, a first characteristic vector describing the respective first audio segment;

obtaining a further recording having one or more second audio segments associated to respective second time windows;

analyzing the one or more second audio segments to obtain one or more characteristic vectors describing the one or more second audio segments;

matching the one or more second characteristic vectors with the plurality of the first characteristic vectors to recognize at least one anomaly when compared to an acoustic normal situation for this environment; and the method:

when analyzing, comprising the sub-step of identifying a repetition pattern in the plurality of the first time windows; or comprising recognizing an order of first characteristic vectors belonging to different first audio segments or recognizing an order of groups of identical or similar first characteristic vectors;

when said computer program is run by a computer.

15. An apparatus for recognizing acoustic anomalies, comprising:

an interface for obtaining a long-term recording having a plurality of first audio segments associated to respective first time windows, wherein the long-term recording comprises at least a duration of 1 minute or 10 minutes or at least 1 hour or at least 24 hours; and for obtaining a further recording having one or more second audio segments associated to respective second time windows; and a processor configured for analyzing the plurality of the first audio segments to obtain, for each of the plurality of the first audio segments, a first characteristic vector describing the respective first audio segment, and configured for analyzing the one or more second audio segments to obtain one or more characteristic vectors describing the one or more second audio segments, and configured for matching the one or more second characteristic vectors with the plurality of the first characteristic vectors to recognize at least one anomaly when compared to an acoustic normal situation for this environment; and said processor:

when analyzing, configured for identifying a repetition pattern in the plurality of the first time windows; or configured for recognizing an order of first characteristic vectors belonging to different first audio segments or recognizing an order of groups of identical or similar first characteristic vectors.

16. The apparatus in accordance with claim 15, the apparatus comprising a microphone or a microphone array connected to the interface.

17. The apparatus in accordance with claim 15, the apparatus comprising an output interface for outputting a probability of occurrence of the respective first audio segment having the respective first characteristic vector or for outputting a probability of occurrence of the respective first audio segment having the respective first characteristic vector and a first time window.

* * * * *